United States Patent
Choudhary et al.

(10) Patent No.: US 11,416,212 B2
(45) Date of Patent: Aug. 16, 2022

(54) CONTEXT-BASED USER AGENT

(71) Applicant: Microsoft Technology Licensing, LLC, Redmond, WA (US)

(72) Inventors: Sreekar Choudhary, Bothell, WA (US); John Henson, Seattle, WA (US); Kevin Barnes, Seattle, WA (US); Louis Valentine, Seattle, WA (US); Zachariah Glen Johnson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 15/249,263

(22) Filed: Aug. 26, 2016

(65) Prior Publication Data

US 2017/0337035 A1    Nov. 23, 2017

Related U.S. Application Data

(60) Provisional application No. 62/337,788, filed on May 17, 2016.

(51) Int. Cl.
*G06F 3/00* (2006.01)
*G06F 3/16* (2006.01)
(Continued)

(52) U.S. Cl.
CPC .............. *G06F 3/167* (2013.01); *G06F 3/048* (2013.01); *G06F 3/0481* (2013.01); *G06F 9/451* (2018.02); *G06F 2203/04803* (2013.01)

(58) Field of Classification Search
CPC ........... G06F 3/167; G06F 2203/04803; G06F 9/451; G06F 3/048; G06F 3/10487; G06F 3/0481

See application file for complete search history.

(56) References Cited

U.S. PATENT DOCUMENTS 6,327,566 B1 * 12/2001 Vanbuskirk ............. G10L 15/22
704/E15.04
7,225,271 B1 * 5/2007 DiBiasio ............. H04L 47/2441
709/224

(Continued)

FOREIGN PATENT DOCUMENTS

CN    1108785 A    9/1995
CN    1385783 A    12/2002
(Continued)

OTHER PUBLICATIONS

Eadicicco, Lisa, "Siri is always listening. Are you OK with that?" Sep. 9, 2015, Business Insider, 8 pages https://www.businessinsider.com/siri-new-always-on-feature-has-privacy-implications-2015-9.*

(Continued)

*Primary Examiner* — Cesar B Paula
*Assistant Examiner* — David Faber
(74) *Attorney, Agent, or Firm* — Ray Quinney & Nebeker P.C.; John O. Carpenter

(57) ABSTRACT

Techniques and architectures may be used to provide an environment for a speech-based intelligent user assistant (IUA) having a flexible operating system that is based, at least in part, on the context of interaction of a user of a computing system with the computing system. Such a flexible operating system may allow for non-obtrusive communication of the IUA with the user. Thus, for example, a user may communicate with the IUA without interrupting their other activities on the computer, such as playing a video game.

20 Claims, 6 Drawing Sheets

(51) Int. Cl.
*G06F 3/048* (2013.01)
*G06F 9/451* (2018.01)
*G06F 3/0481* (2022.01)

(56) References Cited

U.S. PATENT DOCUMENTS

| | | | |
|---|---|---|---|
| 7,277,944 B1* | 10/2007 | Davie | H04L 47/70 |
| | | | 709/226 |
| 8,326,328 B2 | 12/2012 | LeBeau et al. | |
| 8,677,284 B2 | 3/2014 | Aguilar | |
| 9,113,190 B2 | 8/2015 | Clavin et al. | |
| 9,191,708 B2 | 11/2015 | Soto et al. | |
| 9,256,484 B2 | 2/2016 | Stanley-Marbell et al. | |
| 9,349,217 B1* | 5/2016 | Worley, III | G06F 3/0304 |
| 9,378,467 B1* | 6/2016 | Chaiyochlarb | G06N 20/00 |
| 9,524,606 B1* | 12/2016 | Stasi | G07F 17/3255 |
| 9,811,313 B2* | 11/2017 | Johnson | G06F 3/167 |
| 2002/0169617 A1* | 11/2002 | Luisi | G10L 15/22 |
| | | | 704/E15.044 |
| 2002/0184060 A1* | 12/2002 | Schmitz | G06Q 30/06 |
| | | | 705/6 |
| 2005/0021336 A1* | 1/2005 | Katsuranis | G06F 3/0481 |
| | | | 246/251 |
| 2005/0222907 A1* | 10/2005 | Pupo | G06Q 30/0277 |
| | | | 705/14.73 |
| 2008/0119237 A1* | 5/2008 | Kim | G06F 3/04886 |
| | | | 455/566 |
| 2008/0154608 A1* | 6/2008 | Evermann | H04M 1/72403 |
| | | | 704/270.1 |
| 2008/0215976 A1* | 9/2008 | Bierner | G06Q 99/00 |
| | | | 715/708 |
| 2008/0282204 A1 | 11/2008 | Del Valle Lopez | |
| 2009/0150814 A1 | 6/2009 | Eyer et al. | |
| 2009/0184935 A1* | 7/2009 | Kim | G06F 3/0416 |
| | | | 345/173 |
| 2010/0179998 A1* | 7/2010 | Matteini | G06Q 10/107 |
| | | | 709/204 |
| 2010/0273547 A1* | 10/2010 | Stasi | G07F 17/3269 |
| | | | 463/16 |
| 2011/0246203 A1 | 10/2011 | Byrne et al. | |
| 2011/0285750 A1* | 11/2011 | Choi | G09G 5/00 |
| | | | 345/667 |
| 2013/0090930 A1 | 4/2013 | Monson et al. | |
| 2013/0275138 A1* | 10/2013 | Gruber | G10L 13/00 |
| | | | 704/260 |
| 2014/0028542 A1 | 1/2014 | Lovitt et al. | |
| 2014/0040748 A1* | 2/2014 | Lemay | G06F 3/04817 |
| | | | 715/728 |
| 2014/0089957 A1* | 3/2014 | Badawiyeh | G06Q 30/0241 |
| | | | 725/14 |
| 2014/0218372 A1* | 8/2014 | Missig | G06F 3/167 |
| | | | 345/173 |
| 2014/0317532 A1* | 10/2014 | Ma | H04N 7/152 |
| | | | 715/753 |
| 2015/0127643 A1* | 5/2015 | Cohen | G06F 16/447 |
| | | | 707/725 |
| 2015/0213796 A1 | 7/2015 | Waltermann et al. | |
| 2015/0334558 A1* | 11/2015 | Chen | H04L 67/125 |
| | | | 455/418 |
| 2016/0062464 A1* | 3/2016 | Moussette | G06F 3/04842 |
| | | | 345/173 |
| 2016/0125312 A1* | 5/2016 | Hines | G06Q 10/103 |
| | | | 706/12 |
| 2016/0155443 A1* | 6/2016 | Khan | G06F 3/147 |
| | | | 704/275 |
| 2016/0259656 A1* | 9/2016 | Sumner | G06F 9/4856 |
| 2017/0052760 A1* | 2/2017 | Johnson | A63F 13/215 |
| 2019/0043510 A1* | 2/2019 | Wang | G06F 3/167 |

FOREIGN PATENT DOCUMENTS

| | | |
|---|---|---|
| CN | 101183292 A | 5/2008 |
| CN | 103019535 A | 4/2013 |
| WO | 2014185922 A1 | 11/2014 |
| WO | WO2015094891 A1 | 6/2015 |

OTHER PUBLICATIONS

Siri User Guide, "Using Siri in Handsfree Mode/How To Use Siri", Mar. 30, 2016, 6 pages web.archive.org/web/20160330144607/http://www.siriuserguide.com:80/using-siri-in-handsfree-mode/ web.archive.org/web/20160326173352/http://www.siriuserguide.com:80/how-to-use-siri/.*

Guim, Mark, "How to send an email with Cortana on Windows 10", Windows Central, Aug. 20, 2015, 7 pages https://www.windowscentral.com/how-send-email-cortana-windows-10.*

"International Search Report and Written Opinion Issued in PCT Application No. PCT/US2017/031465", dated Aug. 24, 2017, 13 Pages.

"First Office Action and Search Report Issued in Chinese Patent Application No. 201780031223.6", dated Jan. 5, 2021, 22 Pages.

"Office Action Issued in European Patent Application No. 17728293.6", dated Dec. 17, 2020, 11 Pages.

"Second Office Action Issued in Chinese Patent Application No. 201780031223.6", dated Jun. 11, 2021, 24 Pages.

* cited by examiner

CONTEXT-BASED USER AGENT

CROSS-REFERENCE TO RELATED APPLICATION

This U.S. non-provisional patent application claims priority to U.S. provisional patent application No. 62/337,788, filed on May 17, 2016, the contents of which is herein incorporated by reference in its entirety.

BACKGROUND

An intelligent user (e.g., personal) assistant (IUA), such as Microsoft's Cortana® (Microsoft Corporation, Redmond, Wash.), is a software agent that can perform tasks or services for an individual user of a computing device. These tasks or services may be based on user input, location awareness, and the ability to access information from a variety of online sources such as weather or traffic conditions, news, stock prices, user schedules, retail prices, etc.

An IUA may be operated in any of a number of environments, such as desktop computers, mobile devices, tablets, and a variety of operating systems thereof (e.g., Windows® by Microsoft).

Generally, an IUA may be able to set reminders, recognize natural voice (e.g., audio) without keyboard input, and answer questions using information from a search engine (e.g., current weather and traffic conditions, sports scores, biographies, and so on). An IUA may be able to store personal information of a user, such as interests, location data, reminders, and contacts in social networks. The IUA may draw upon and add to such information to learn the user's specific patterns and behaviors (e.g., machine learning). Generally, users may view and specify what information is collected to allow some control over privacy.

Some IUAs include an active listening function, enabling the IUAs to be invoked with a voice phrase (e.g., the voice phrase "Hey Cortana" may activate Microsoft's Cortana® IUA.

SUMMARY

This disclosure describes techniques and architectures for a speech-based intelligent user assistant (IUA) having a flexible operating system that is based, at least in part, on the context of interaction of a user of a computing system with the computing system. Such a flexible operating system may allow for non-obtrusive communication of the IUA with the user. Thus, for example, a user may communicate with the IUA without interrupting their other activities on the computer, such as playing a video game.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), quantum devices, such as quantum computers or quantum annealers, and/or other technique(s) as permitted by the context above and throughout the document.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Figure 1:
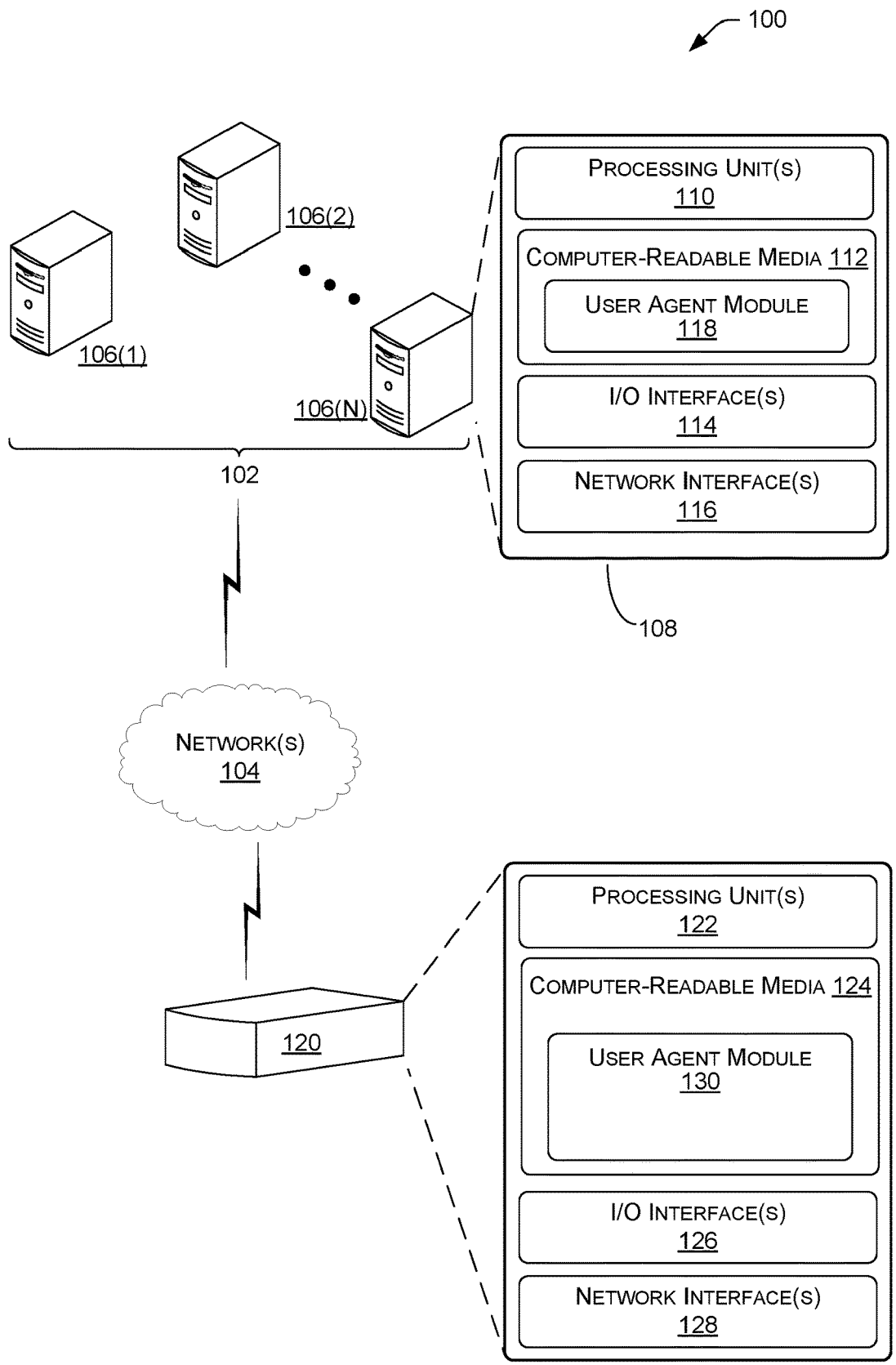
FIG. 1 is a block diagram depicting an environment for operating a speech-based intelligent user agent, according to various examples.

Techniques and architectures described herein involve a speech-based intelligent user assistant (IUA) having a flexible operating system that is based, at least in part, on the context of interaction of a user of a computing system with the computing system. Such a flexible operating system may allow for non-obtrusive communication of the IUA with the user. Thus, for example, a user may communicate with the IUA without interrupting their other activities on the computer, such as playing a video game, engaging in another type of application, or viewing video content, just to name a few examples of content consumption (e.g., consumable media such as games, apps, music, movie, and so on).

In some examples, an IUA may provide its information display in an unobtrusive manner while a primary activity of the user (such as game play or video consumption) may be continued without interruption. For example, during play of a video game, if a user issues a voice command "volume up", the IUA may respond by increasing the game volume without taking the user's focus of attention, hereinafter referred to as "focus", away from game play. In other words, the IUA need not appear in a window on the screen, but may instead operate in the "background", increasing the game volume without any portion of the video game display being obscured. In a counter example, during play of a video game, if a user issues a voice command "send a message to John", the IUA may respond by presenting a window in the screen and require further input (e.g., which "John", what message, and so on) from the user before completing the task and allowing the user to return to game play. In such a case, the user's focus has been taken away from game play.

In some examples, a computing system may provide a user interface (UI) configured to interact with a speech-based IUA in a manner that doesn't require the entire UI to be dominated or taken over by the IUA. Thus, for example, the IUA may interact with the UI without taking focus away from the UI. Via the UI, a user of the computing system may communicate with the computing system by talking and without having to interact by touch, mouse, or other input technique.

In some examples, the speech-based IUA may have an ability to know if a user is in a consumption mode (of the computing system), such as watching a video or playing a game. In such a case, the IUA may interact with the user in a limited fashion, such as providing audio-only output to the user. On the other hand, if the user is operating the computing system in a relatively non-focused fashion, then the IUA may interact with the user via a full IUA interface (e.g., a UI that corresponds to the IUA). For example, if the user is browsing the Internet and produces a voice command (e.g., "Hey Cortana."), then the IUA may display a window for an IUA interface, which provides control buttons and/or information (e.g., answers to a query) for the user.

In another example, a user interacting with the IUA Cortana® while being involved in an experience that needs focus, such as playing a video game, need not be distracted from the game by Cortana's output (e.g., responses). In this case, the IUA, which need not display a window, may interact with the user primarily (or only) by audio input/output.

In some examples, a type of interaction (e.g., obtrusiveness) of an IUA may depend, at least in part, on the context of the user. For example, such context may associated with location of the user, current actions of the user, historical actions or behaviors of the user, perceived intent of the user, number of cycles or turns needed to fully respond to the user, voice commands of the user, preset custom configurations of the IUA by the user, and whether the user is operating a vehicle, among other things. For example, intent of the user may be perceived, at least in part, by detecting volume and/or tone of voice and/or rate of talking. In a particular example, the user may provide the voice command "turn off" to Cortana® (or other IUA), which may respond in a fashion that depends on the context of the user. If the user does not have any currently executing applications, then the IUA (e.g., Cortana® in this example) may respond by turning off the computing system (or a portion thereof). If the user is playing a Xbox® game, then the IUA may respond by saying "are you sure you want to turn off Xbox?" In this latter case, the context is the user playing a video game, and the IUA responds based on this context. Moreover, the IUA may respond with audio-only output (or a relatively small window near the edge of the screen, adjacent to the displayed video game window) so as to not visually distract the user from the video game.

In some particular examples involving virtual reality (VR) platforms (e.g., HoloLens®), an IUA may monitor the context of interaction between a user and the VR platform. As explained above, the IUA may interact with the user in any of a number of fashions, depending, at least in part, on the context of the user. Such interaction may be audio-only, a 3D holographic button icon that appears to the user to be floating into or out of the user's vision, or a window on a desktop UI. As mentioned above, the type of interaction selected by the IUA may depend, at least in part, on the context of interaction between the user and the VR platform, with an intent to be relatively unobtrusive and avoid being distracting or interfering with the user's interactions with the VR platform.

In some examples, a user may interact with a video game platform and a IUA. In some particular examples, such a video game platform may be Xbox® and the IUA may be Cortana®, though features described herein may be applied to any of a number of other platforms and IUAs, and claimed subject matter is not so limited. Cortana (or another IUA) may have an associated "experience manager," which need not be platform-specific. Thus, the experience manager may be configured to interact with any of a number of platforms or applications, and not just a single platform or application. For example, one experience manager may be configured to interact with Xbox and thus enable the IUA to interact with Xbox. In other words, the IUA may be "customized" to interact with Xbox. Another experience manager may be configured to interact with HoloLens and thus enable the IUA to interact with HoloLens. In other words, the IUA may be "customized" to interact with HoloLens.

For a particular case involving Xbox and an IUA, for example, a system may be in one of three primary states before a user begins an interaction with the IUA. In a state 1, the IUA is visible in at least a portion of a screen. In this state, the user may not be playing with Xbox or may be interacting with Xbox in such a way that doesn't require the user's attention to Xbox. In a state 2, the IUA is not visible and the user is playing a game. In a state 3, the IUA is not visible and the user is not playing a game. These states are described in detail below.

If the user begins interacting with the IUA in state 1, the interaction may remain in an already-visible IUA window, which may operate the same as or similar to an IUA that one would see on a desktop or smartphone, for example. In states 2 and 3, an experience manager overlay may appear and the user interaction with the IUA occurs without interrupting the current experience. In state 1, a response by the IUA to the user action may be displayed in the already visible IUA window and may operate as on a desktop or smartphone, for example. In states 2 and 3, depending on the decision of the IUA (or "voice agent" thereof, as described below) that is handling the user action, the IUA may decide whether (i) the interaction can be displayed by the experience manager or (ii) the interaction is to be displayed in the full IUA application.

In state 2, a response by the IUA may be displayed in a relatively small window, herein called a "snap application slot". In this fashion, the IUA will not take focus away from the user currently operating the Xbox game. For example, a personal computer, Xbox, or other computing devices may achieve multitasking by splitting the screen between two applications. On Xbox, for example, the screen may be split so that the right side of the screen includes a game being played while the left side of the screen displays the IUA window. Such screen splitting is called "snapping," and the screen that includes the IUA window is called a "snap slot". In some situations, the user can see an IUA response (e.g., in reaction to an action by the user), but may not be able to directly act on the response unless the user takes explicit action to switch focus out of their game to the IUA. In state 3, the response may appear in the IUA window and focus may be moved into the IUA so that the user can directly interact with the IUA response.

In some examples, an IUA may allow for a "do-not-disturb" mode in which users may specify "quiet hours" or a partial shutdown of functionality of the IUA. Examples described herein are directed to features of IUAs that are different from (and in addition to) such a mode or partial shutdown.

Various examples are described further with reference to FIGS. 1-7.

FIG. 1 is a block diagram depicting an environment 100 for operating a speech-based intelligent user agent, according to various examples. In some examples, the various devices and/or components of environment 100 include distributed computing resources 102 that may communicate with one another and with external devices via one or more networks 104.

For example, network(s) 104 may include public networks such as the Internet, private networks such as an institutional and/or personal intranet, or some combination of private and public networks. Network(s) 104 may also include any type of wired and/or wireless network, including but not limited to local area networks (LANs), wide area networks (WANs), satellite networks, cable networks, Wi-Fi networks, WiMax networks, mobile communications networks (e.g., 3G, 4G, 5G, and so forth) or any combination thereof. Network(s) 104 may utilize communications protocols, including packet-based and/or datagram-based protocols such as internet protocol (IP), transmission control protocol (TCP), user datagram protocol (UDP), or other types of protocols. Moreover, network(s) 104 may also include a number of devices that facilitate network communications and/or form a hardware basis for the networks, such as switches, routers, gateways, access points, firewalls, base stations, repeaters, backbone devices, and the like.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards. Network(s) 104 may also include network memory, which may be located in a cloud, for example. Such a cloud may be configured to perform actions based on executable code, such as in cloud computing, for example. Cloud computing is a type of Internet-based computing that provides shared computer processing resources and data to computers and other devices on demand. Cloud computing may enable ubiquitous, on-demand access to a shared pool of configurable computing resources (e.g., computer networks, servers, storage, applications and services), which may be rapidly provisioned and released with minimal management effort. Cloud computing and storage solutions may provide users and enterprises with various capabilities to store and process their data in third-party data centers, for example, that may be located far from the user-ranging in distance from across a city to across the world. Cloud computing relies on sharing of resources to achieve coherence and economy of scale, similar to a utility (e.g., like the electricity grid) over an electricity network.

In various examples, distributed computing resource(s) 102 includes computing devices such as devices 106(1), 106(2), . . . 106(N). Examples support scenarios where device(s) 106(1), 106(2), . . . 106(N) may include one or more computing devices that operate in a cluster or other grouped configuration to share resources, balance load, increase performance, provide fail-over support or redundancy, or for other purposes. Although illustrated as desktop computers, device(s) 106(1), 106(2), . . . 106(N) may include a diverse variety of device types and are not limited to any particular type of device. Device(s) 106(1), 106(2), . . . 106(N) may include specialized computing device(s) 108.

For example, device(s) 106(1), 106(2), . . . 106(N) may include any type of computing device, including a device that performs cloud data storage and/or cloud computing, having one or more processing unit(s) 110 operably connected to computer-readable media 112, I/O interfaces(s) 114, and network interface(s) 116. Computer-readable media 112 may have a user agent module 118 stored thereon. For example, user agent module 118 may comprise computer-readable code that, when executed by processing unit(s) 110, operate a speech-based IUA. In some cases, however, a user agent module need not be present in specialized computing device(s) 108.

A specialized computing device(s) 120, which may communicate with device(s) 106(1), 106(2), . . . 106(N) (including network storage, such as a cloud memory/computing) via networks(s) 104, may include any type of computing device having one or more processing unit(s) 122 operably connected to computer-readable media 124, I/O interface(s) 126, and network interface(s) 128. Computer-readable media 124 may have a specialized computing device-side user agent module 130 stored thereon. For example, similar to or the same as user agent module 118, user agent module 130 may comprise computer-readable code that, when executed by processing unit(s) 122, operate a speech-based IUA. In some cases, however, an user agent module need not be present in specialized computing device(s) 120. For example, such a user agent module may be located in network(s) 104.

Figure 2:
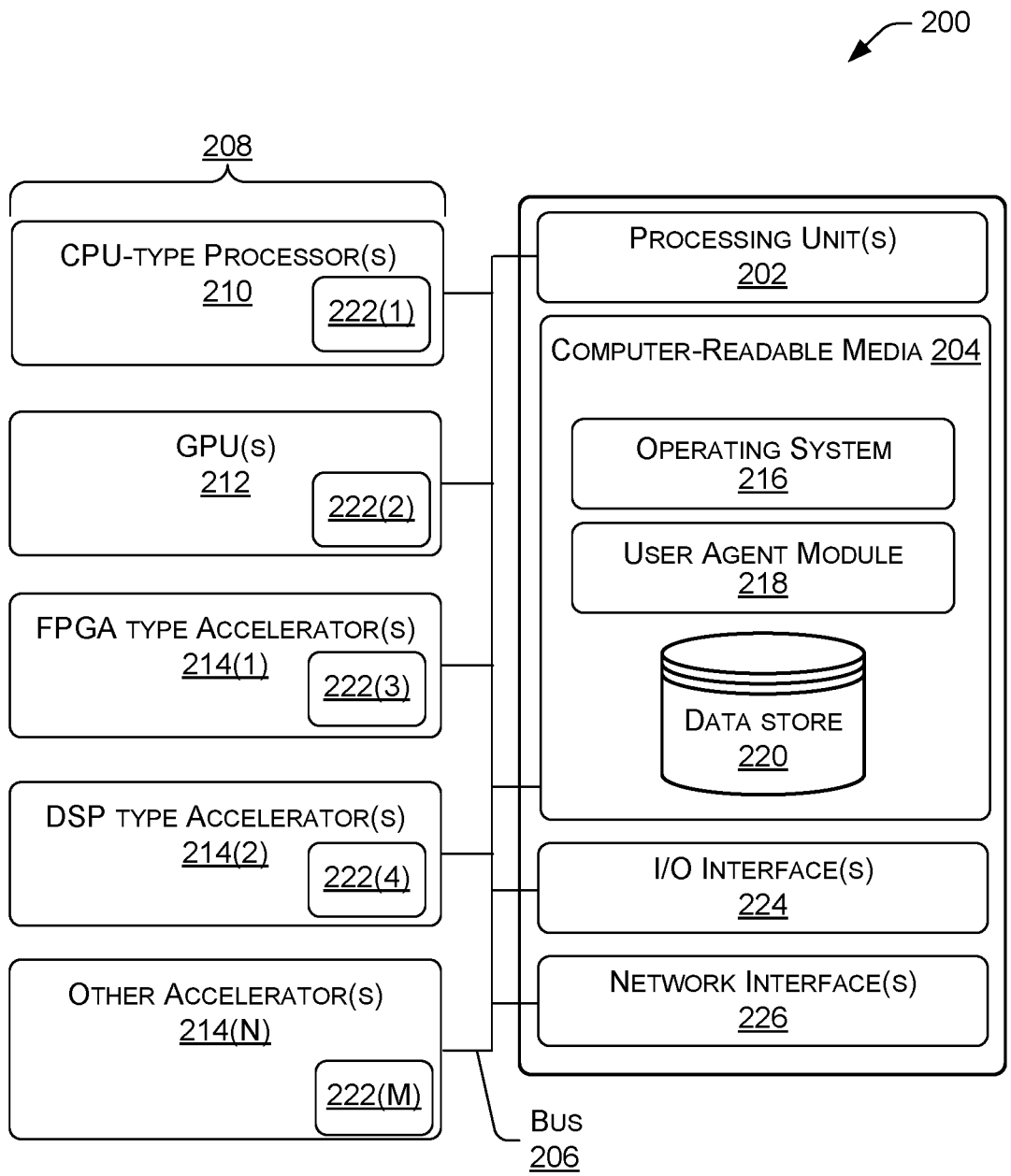
FIG. 2 is a block diagram depicting a device for operating a speech-based intelligent user agent, according to various examples.

FIG. 2 depicts an illustrative device 200, which may represent device(s) 106(1), 106(2), . . . 106(N) or 108, for example. Illustrative device 200 may include any type of computing device having one or more processing unit(s) 202, such as processing unit(s) 110 or 122, operably connected to computer-readable media 204, such as computer-readable media 112 or 124. The connection may be via a bus 206, which in some instances may include one or more of a system bus, a data bus, an address bus, a PCI bus, a Mini-PCI bus, and any variety of local, peripheral, and/or independent buses, or via another operable connection. Processing unit(s) 202 may represent, for example, a CPU incorporated in device 200. The processing unit(s) 202 may similarly be operably connected to computer-readable media 204.

The computer-readable media 204 may include, at least, two types of computer-readable media, namely computer storage media and communication media. Computer storage media may include volatile and non-volatile machine-readable, removable, and non-removable media implemented in any method or technology for storage of information (in compressed or uncompressed form), such as computer (or other electronic device) readable instructions, data structures, program modules, or other data to perform processes or methods described herein. The computer-readable media 112 and the computer-readable media 124 are examples of computer storage media. Computer storage media include, but are not limited to hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

In contrast, communication media may embody computer-readable instructions, data structures, program modules, or other data in a modulated data signal, such as a carrier wave, or other transmission mechanism. As defined herein, computer storage media does not include communication media.

Device 200 may include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s) 208, such as CPU-type processors (e.g., micro-processors) 210, GPUs 212, or accelerator device(s) 2H 214(1), 214(2), 214(N).

In some examples, as shown regarding device 200, computer-readable media 204 may store instructions executable by the processing unit(s) 202, which may represent a CPU incorporated in device 200. Computer-readable media 204 may also store instructions executable by an external CPU-type processor 210, executable by a GPU 212, and/or executable by an accelerator, such as an FPGA type accelerator 214(1), a DSP type accelerator 214(2), or any internal or external accelerator 214(N).

Executable instructions stored on computer-readable media 202 may include, for example, an operating system 216, a user agent module 218, and other modules, programs, or applications that may be loadable and executable by processing units(s) 202, and/or 210. For example, user agent module 218 may comprise computer-readable code that, when executed by processing unit(s) 202, a speech-based IUA. In some cases, however, a user agent module need not be present in device 200.

Alternatively, or in addition, the functionally described herein may be performed by one or more hardware logic components such as accelerators 214(1), 214(2), 214(N). For example, and without limitation, illustrative types of hardware logic components that may be used include Field-programmable Gate Arrays (FPGAs), Application-specific Integrated Circuits (ASICs), Application-specific Standard Products (ASSPs), quantum devices, such as quantum computers or quantum annealers, System-on-a-chip systems (SOCs), Complex Programmable Logic Devices (CPLDs), etc. For example, accelerator 214(N) may represent a hybrid device, such as one that includes a CPU core embedded in an FPGA fabric.

In the illustrated example, computer-readable media 204 also includes a data store 220. In some examples, data store 220 includes data storage such as a database, data warehouse, or other type of structured or unstructured data storage. In some examples, data store 220 includes a relational database with one or more tables, indices, stored procedures, and so forth to enable data access. Data store 220 may store data for the operations of processes, applications, components, and/or modules stored in computer-readable media 204 and/or executed by processor(s) 202 and/or 210, and/or accelerator(s) 214(1), 214(2), 214(N). For example, data store 220 may store version data, iteration data, clock data, private data, voice data, and various state data stored and accessible by user agent module 218. Alternately, some or all of the above-referenced data may be stored on separate memories such as a memory 222(1) on board CPU type processor 210 (e.g., microprocessor(s)), memory 222(2) on board GPU 212, memory 222(3) on board FPGA type accelerator 214(1), memory 222(4) on board DSP type accelerator 214(2), and/or memory 222(M) on board another accelerator 214(N).

Device 200 may further include one or more input/output (I/O) interface(s) 224, such as I/O interface(s) 114 or 126, to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a screen, a printer, audio speakers, a haptic output, and the like). Device 200 may also include one or more network interface(s) 226, such as network interface(s) 116 or 128, to enable communications between computing device 200 and other networked devices such as other device 120 over network(s) 104 and network storage, such as a cloud network. Such network interface(s) 226 may include one or more network interface controllers (NICs) or other types of transceiver devices to send and receive communications over a network.

Figure 3:
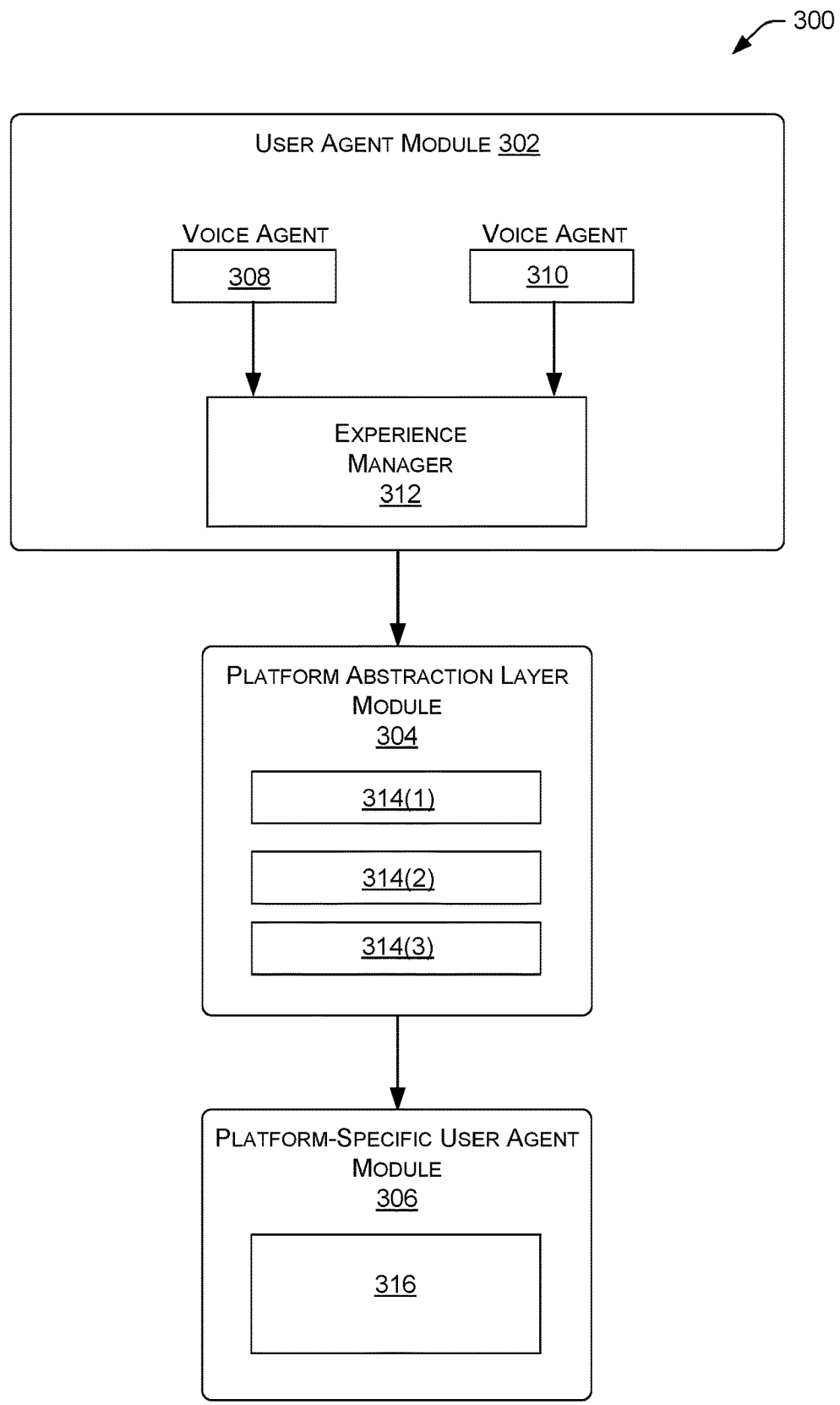
FIG. 3 is a block diagram of an example architecture of a speech-based intelligent user agent.

FIG. 3 is a block diagram of an example architecture of a speech-based IUA 300, which may reside in a device, such as 200, for example. IUA 300 may be the same as or similar to user agent module 118, 130, or 218. IUA 300 may include a user agent module 302, a platform abstraction layer (PAL) module 304, and a platform-specific user agent module 306. In some particular examples, user agent module 302 may be a version of the Cortana application, though claimed subject matter is not so limited.

User agent module 302 may include a number of voice agents, such as a "volume" voice agent 308 and an "inquiry" voice agent 310. Other voice agents (not illustrated) may respectively correspond to other functions or functionality performed by an operating system of the device or an application executed by the device. In some examples, such voice agents may be in the Cloud. Voice agents may provide determinations about the type of interaction to apply between the IUA and the user. Types of interactions range from, for example, implementing a command (e.g., volume increase) in the background with no user focus to a relatively large IUA window and full focus (e.g., an Internet search). A voice agent may make such determination based, at least in part, on the type of voice agent and/or the particular application (e.g., Xbox or HoloLens) that is running and interacting with the user. Voice agents existing in the Cloud may make such determinations in the cloud, for example.

User agent module 302 may further include an "experience manager" 312, which may be a module embedded or otherwise controlled by the user agent module. Based, at least in part, on the context of interaction between a user of the device and a platform (e.g., Windows.RTM., an application, Xbox, HoloLens, etc.), experience manager 312 may allow the user to experience various types (or levels) of obtrusion of the IUA in the platform. Experience manager 312 may be flexible enough that it can define different semantics for different platforms/contexts/situations. Such functionality may be implemented by PAL module 304, which may include any of a number of functional blocks 314(1), 314(2), 314(3). For example, user agent module 302 may function in the background relative to an interaction between the user and the platform. User agent module 302 may listen to (e.g., detect audio signal of) speech flow while executing experience manager 312. PAL module 304 may be configured to adapt the functionality of experience manager 312 to different platforms. Thus, for example, PAL module 304 may be configured to allow experience manager 312 to operate and interact with Xbox. On the other hand, PAL module 304 may be configured to allow experience manager 312 to operate and interact with HoloLens. In other words, experience manager 312 may be platform agnostic, and PAL module 304 (which may have "customized" logic directed to a particular platform) may act as a communication link between the experience manager and a particular platform.

Platform-specific user agent module 306 may generate a visual overlay. For example, there may be an interface (e.g., algorithm) 316 that allows a device to implement its own presentation of information. For a few particular examples, a clock or calendar may present information in a status bar of a screen, Xbox may present information as a non-focusable overlay in the corner of the screen, and HoloLens may present information as a floating window that follows a user as the user's head turns. An example implementation may use as a trigger the beginning of a user's speech flow, the steps of that flow, and the end of that flow to determine when to show information to the user, display text of what has been heard, and display responses to the user's actions, just to name a few examples. Each platform may decide the best way (e.g., audio, visual, etc.) to present the information to the user in a non-intrusive fashion. In some particular examples, experience manager 312 may receive and use various types of information from user agent module 302 while operating with a user-interacted application. Such information may include, for example, a displayed persona being targeted by the application, as described below, recognized text, speech state, and response text from a voice agent (e.g., 308, 310). Communication of such information may be one way and IUA 300 may display the above information in a visual overlay while user agent module 302 is hidden.

Figure 4:
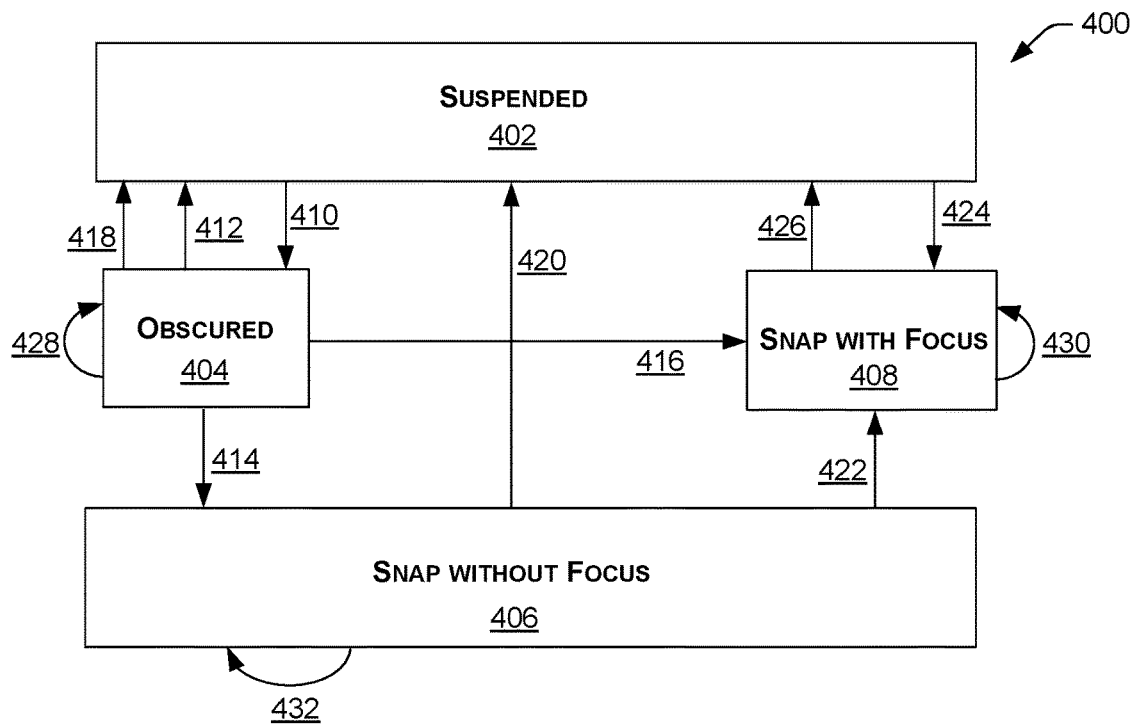
FIG. 4 is a flow diagram of example transitions among various states of a speech-based intelligent user agent.

FIG. 4 is a flow diagram 400 of example transitions among various states of a speech-based IUA, such as that illustrated in FIG. 3. Various states, illustrated as blocks, include suspended state 402, obscured state 404, snap without focus state 406, and snap with focus state 408. Such states correspond to different modes of operating the IUA and functionality of the IUA including how a window of the IUA is displayed (or not displayed). For example, in snap with focus state 408, a window of the IUA may be visible in a "snap slot," which is a relatively small portion (e.g., the upper-right portion) of the screen, and input focus may be inside of the window of the IUA such that a user can interact with the IUA using a controller or other input device (e.g., mouse, keyboard, and so on). The window of the IUA may include displayable persona, which include any number of features that tend to give the IUA a personality. Such displayable persona may correspond to audible persona, which include speech interactions with the user. In some particular examples, the IUA may be Cortana, but claimed subject matter is not so limited and descriptions herein may be applied to any of a number of other IUAs.

In suspended state 402, though at least a portion of executable code of the IUA may be in memory associated with an operating system, the IUA may not occupy any CPU cycles during general computing operations. In obscured state 404, the IUA may be running in the background of general computing operations. For example, a user may be playing an Xbox game while the IUA runs in the background and is not noticeable to the user. In such a state, the IUA may be responsive to speech or voice commands from the user. In the snap without focus state 406, the IUA is displayed in a snap slot but, except in response to speech input by the user, does not take input focus. In other words, the user interface of the IUA (e.g., the window of the IUA) is noticeable, such as being a relatively small window (or icon) near an edge of the screen so as not to obscure any portion of screen area being used by other applications interacting with the user. In this fashion, the user may be aware that the IUA is present and ready to interact with the user. Such interaction may be prompted by an action by the user. In the snap with focus state 408, the window of the IUA is displayed in a snap and takes focus. In other words, the user interface of the IUA (e.g., the window of the IUA) is noticeable and control (e.g., mouse interaction) shifts to within the user interface of the IUA (e.g., a click of the mouse will affect operations within the IUA window, not other displayed applications). The user interface of the IUA may be a relatively large or small window in the screen and may (but need not) obscure any portion of screen area being used by other applications (that were) interacting with the user. In this fashion, the user may be aware that the IUA is present and ready to interact with the user.

In some examples, a transition from suspended state 402 to obscured state 404 may be prompted by keyword or phrase spoken by the user. A keyword spotter algorithm may be used to detect such a keyword or phrase (e.g., "Hey Cortana," in the particular case of IUA being Cortana). As a result, suspended state 402 may transition to obscured state 404, as represented by arrow 410. For example, the keyword spotter algorithm may call into the IUA PAL layer to activate the IUA in obscured state 404. Experience manager APIs of an application that is interacting with the user (e.g., Xbox) may be called to display particular IUA persona. In other words, the IUA persona may be "customized" or modified to correspond to features of the application that is currently interacting with the user.

In the obscured state 404, the IUA may be listening for possible voice commands by the user and communicating (via display and/or via speech) status, persona state, recognized text, message for the user, and so on. Accordingly, the keyword spotter algorithm may be used to detect a keyword or phrase that prompts a transition from obscured state 404 to suspended state 402, represented by arrow 412, or to snap without focus state 406, represented by arrow 414, or to snap with focus state 408, represented by arrow 416.

If the transition from suspended state 402 to obscured state 404 was prompted by a keyword or phrase corresponding to a one-shot command for an action (e.g., such as "launch app" or "show achievement"), as represented by arrow 412, the action is performed, the experience manager times out, and the IUA application may then be suspended.

If the transition from suspended state 402 to obscured state 404 was prompted by a keyword or phrase corresponding to a command that requires displaying an informational UI, such as weather or news, then the IUA may be displayed in snap slot but need not have input focus. In some examples, the user may be interacting with an application (e.g., Xbox) other than the IUA. In such cases, the snapped IUA may communicate with a UI of the application.

In some examples, the IUA may transition from obscured state 404 to suspended state 402, represented by arrow 418, in response to a timeout condition. Similarly, the IUA may transition from snap without focus state 406 to suspended state 402, represented by arrow 420, in response to such a timeout condition.

In some examples, the IUA may transition from snap without focus state 406 to snap with focus state 408, represented by arrow 422, in response to a side bar launch. For example, the transition from snap without focus to snap with focus may occur if the IUA is presenting results that need further action to complete the flow, such as in the following particular example: While the IUA is in a non-focus state, a user says a command that is interpreted as a general search on the internet. The IUA comes from either the suspended state 402 or non-focus state 406 to focused state 408, when presenting results (e.g., links/videos) that correspond to the search results. This allows the user to click on the results to launch the desired page to complete the flow. Similarly, the IUA may transition from suspended state 402 to snap with focus state 408, represented by arrow 424, in response to such a side bar launch. Also, the IUA may transition from obscured state 402 to snap with focus state 408, represented by arrow 416, in response to such a side bar launch.

The IUA may transition from snap with focus state 408 to suspended state 402, represented by arrow 426, in response to the user closing the IUA, for example. Arrow 428 represents a process where voice commands presented by the user during obscured state 404 do not prompt a transition to another state. Arrow 430 represents a process where voice commands presented by the user during snap with focus state 408 do not prompt a transition to another state. Similarly, arrow 432 represents a process where voice commands presented by the user during snap without focus state 406 do not prompt a transition to another state.

Figure 5:
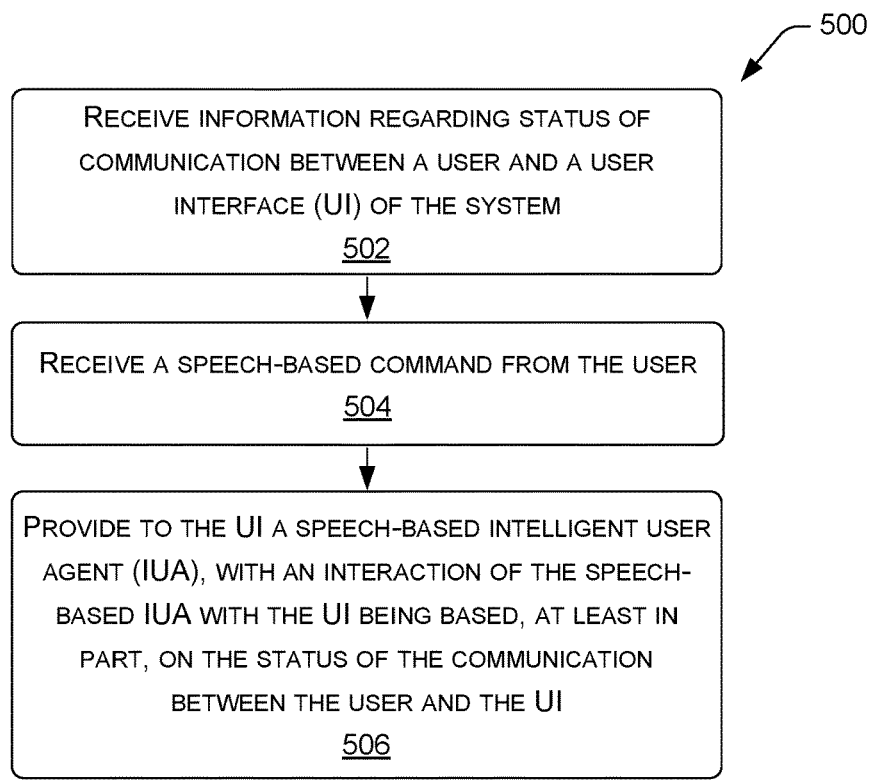
FIG. 5 is a flow diagram illustrating a process for operating a speech-based intelligent user agent, according to some examples.
Figure 6:
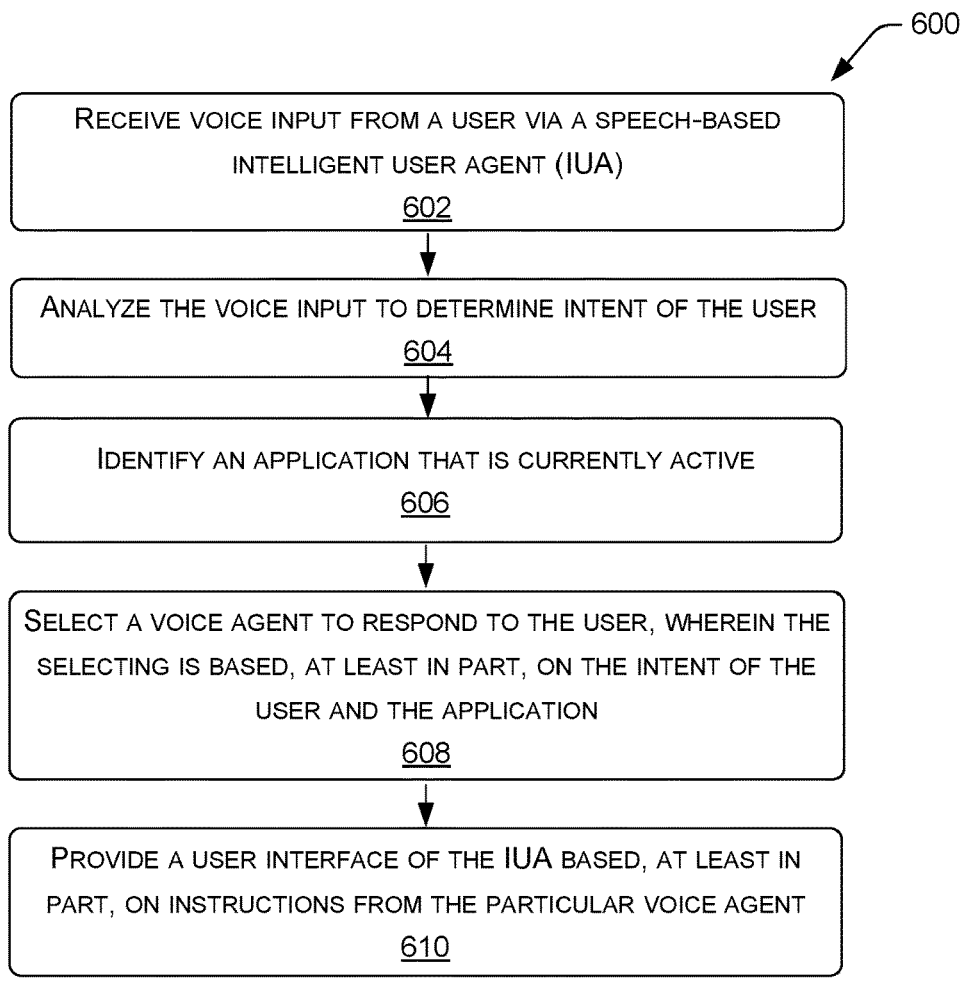
FIG. 6 is a flow diagram illustrating a process for operating a speech-based intelligent user agent, according to some examples.
Figure 7:
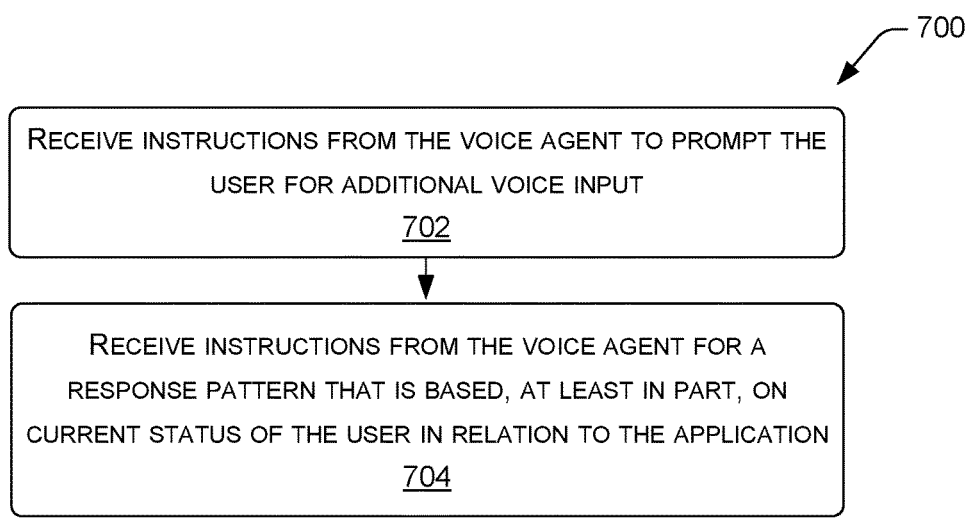
FIG. 7 is a flow diagram illustrating a process for operating a speech-based intelligent user agent, according to some examples.

FIGS. 5-7 are flow diagrams illustrating processes for operating a speech-based intelligent user agent, according to some examples. The flows of operations illustrated in FIGS. 5-7 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any process descriptions, variables, or blocks in the flows of operations illustrated in FIGS. 5-7 may represent modules, segments, or portions of code that include one or more executable instructions for implementing specific logical functions or variables in the process.

Referring to FIG. 5, process 500 may be performed by a processor such as processing unit(s) 110, 122, and 202, for example. At 502, the processor may receive information regarding a status of communication between a user and a user interface (UI) of the system. For example, the UI may be a window in a screen. The user may be interacting with a video game or watching a video displayed in the window, for example. Status of communication may include the context of which the user communicates with an application driving the UI. For example, the application may be a video game application or a streaming video application. Communication status may involve the type or level of focus the user has directed to the application. An example of a relatively high level of focus may be where the user is actively interacting with a video game, and the user continuously enters input (e.g., operating of joystick) to control features of the video game. An example of a relatively low level of focus may be where the user interacts with a video game from time to time, and occasionally leaves the window of the video game to interact with another application. In such a case, long-term or short-term history of the user's actions (which may be stored in memory) may be used by the processor to determine, at least in part, the user's level of focus.

At block 504, the processor may receive a speech-based command from the user. Such a command may be one or more words or phrases spoken by the user. A particular example for Cortana is "Hey Cortana." Other examples, include "volume up/down", send message to . . . ", "turn off", and so on. At block 506, the processor may provide to the UI a IUA, with a type of interaction of the speech-based IUA with the UI being based, at least in part, on the status of the communication between the user and the UI. For example, a relatively low level of interaction may be where the IUA operates in the background and is not visible (e.g., not displayed) to the user. Interaction in this case may be limited to speech (audio). An example of relatively high level of interaction may be where the IUA displays a window that snaps the focus of the user from another location (e.g., video game play or video viewing) to the IUA window.

Referring to FIG. 6, process 600 may be performed by a processor such as processing unit(s) 110, 122, and 202, for example. At block 602, the processor may receive voice input from a user via a speech-based intelligent user agent (IUA). Such an IUA may be similar to or the same as Cortana, for example. At block 604, the processor may analyze the voice input to determine intent of the user. Such analysis, which may be performed in the cloud, may use speech recognition techniques that may involve deep learning, for example. At block 606, the processor may identify an application that is currently active. Such an application may be a video game or a steaming video application, for example. An example of an active application (e.g., that is interacting with the user) may be where the user operates an input device (e.g., joy stick, mouse, keyboard, etc.) to at least partially control the application. In some examples, the user may be operating in a virtual reality platform and the active application currently interacting with the user may be executing in the virtual reality platform.

At block 608, the processor may select a voice agent to respond to the user. The selecting may be based, at least in part, on the intent of the user and the application. In some examples, the voice agent may be located in the Cloud. At block 610, the processor may provide a user interface of the IUA in response to instructions from the particular voice agent. For example, such instructions may determine whether the user interface of the IUA takes focus from the application or whether the user interface operates in the background and does not take focus. In some examples, displaying the user interface of the IUA may be displaying an icon or window that does not obscure any portion of a window of the displayed application.

Referring to FIG. 7, process 700 may be performed by a processor such as processing unit(s) 110, 122, and 202, for example. At 702, the processor may receive instructions from the voice agent to prompt the user for additional voice input. For example, the initial voice input may be a command that is incomplete without additional information. The command "Send message," for example, may require additional voice input to determine to where the message should be sent. In another example, the command "Send text to Bob" may require additional voice input to determine which among a number of Bobs in the user's contact list the text is to be sent.

In some examples, at block 704, the processor may receive instructions from the voice agent for a response pattern that is based, at least in part, on current status of the user in relation to the application. The response pattern may include changing among two or more levels of focus of the user interface of the IUA, for example.

Figure 8:
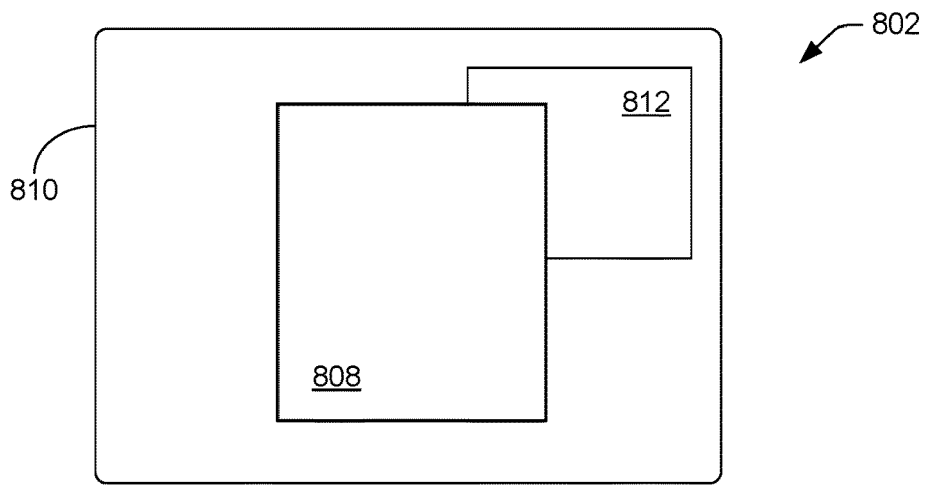
FIG. 8 illustrate several example screens with varying degrees of interaction by a speech-based intelligent user agent.
Figure 8:
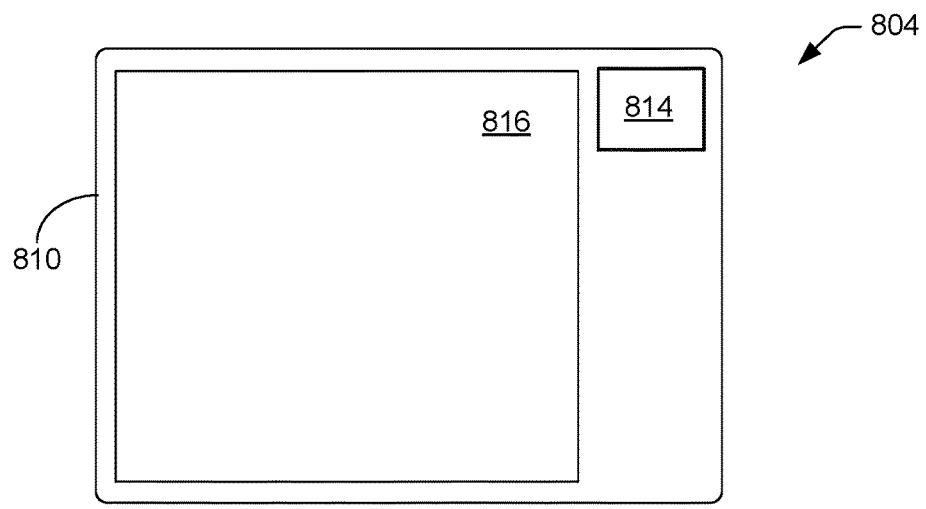
Figure 8:
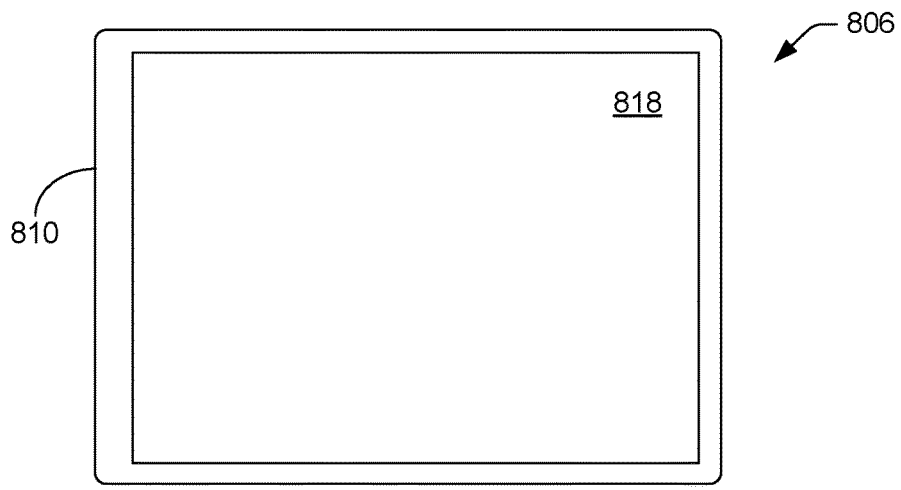

FIG. 8 illustrate several example situations, 802, 804, and 806, of a computer system with varying degrees of interaction by a speech-based IUA. Such interaction, or obtrusion, may be varied based, at least in part, on the context or state of interaction between a user and the computer system (or an application executed thereon). For example, in situation 802, a UI 808 for the IUA may dominate screen 810 by having a relative large presence in the screen. UI 808 may overlay other features of the screen, such as a window 812, for example, which may be displaying an application (e.g., a video game). In another example, in situation 804, a UI 814 for the IUA may be relative unobtrusive in screen 810 by having a relative small presence in the screen and may be situated close to an edge of the screen while a window 816 of an application (e.g., a video game) may occupy most of the screen. In still another example, in situation 806, a UI for the IUA may be audio-only and thus unobtrusive in screen 810 by not having a presence in the screen. Meanwhile, a window 818 of an application (e.g., a video game window) may occupy most of the screen.

Example Clauses

A. A system comprising: one or more processors; and memory storing instructions to, upon execution by the one or more processors, configure the one or more processors to perform operations comprising: receiving information regarding a status of communication between a user and a user interface (UI) of the system; receiving a speech-based command from the user; and providing to the UI a speech-based intelligent user agent (IUA), an interaction of the speech-based IUA with the UI being based, at least in part, on the status of the communication between the user and the UI.

B. The system as paragraph A recites, wherein the communication between the user and the UI comprises the user consuming content, including at least one of playing a video game, engaging in an application, or viewing video content.

C. The system as paragraph B recites, wherein the interaction of the speech-based IUA with the UI includes displaying on a screen an interface of the speech-based IUA adjacent to a portion of the screen that is displaying the content without obscuring any of the portion of the screen that is displaying the content.

D. The system as paragraph A recites, wherein the interaction of the speech-based IUA with the UI includes an audio-only mode.

E. The system as paragraph A recites, wherein the interaction of the speech-based IUA with the UI is further based, at least in part, on the speech-based command.

F. The system as paragraph A recites, wherein the communication between the user and the UI comprises the user interacting with the UI via a virtual reality platform.

G. A system comprising: one or more processing units; and computer-readable media with modules thereon, the modules comprising: a user agent module configured to operate a speech-based intelligent user agent (IUA), wherein the user agent module is further configured to recognize voice commands from a user of the system; a platform abstraction layer (PAL) module configured to receive instructions from the user agent module, wherein the PAL module is further configured to set a type of interaction between the IUA and the user; and a platform-specific user agent module configured to provide a communication interface between the PAL module and the user of the system.

H. The system as paragraph G recites, wherein the PAL module is further configured to set the type of interaction between the IUA and the user based, at least in part, on a context of the user with respect to the system.

I. The system as paragraph G recites, wherein the PAL module is further configured to set the type of interaction between the IUA and the user based, at least in part, on at least one of current or historical actions of the user.

J. The system as paragraph G recites, wherein the platform-specific user agent module is further configured to provide the IUA to the user with the type of interaction set by the PAL module.

K. The system as paragraph G recites, wherein the platform-specific user agent module is further configured to determine, based at least in part on a particular platform, whether the type of interaction is audio, visual, or both audio and visual.

L. The system as paragraph G recites, wherein the platform-specific user agent module is further configured to determine, based at least in part on a particular platform, a type focus for input to the IUA from the user.

M. A method comprising: receiving voice input from a user via a speech-based intelligent user agent (IUA); analyzing the voice input to determine intent of the user; identifying an application that is currently active; selecting a voice agent to respond to the user, wherein the selecting is based, at least in part, on the intent of the user and the application; and providing a user interface of the IUA in response to instructions from the voice agent.

N. The method as paragraph M recites, wherein the voice agent is located in the Cloud.

O. The method as paragraph M recites, further comprising: receiving instructions from the voice agent to prompt the user for additional voice input.

P. The method as paragraph M recites, further comprising: receiving instructions from the voice agent for a response pattern that is based, at least in part, on current status of the user in relation to the application.

Q. The method as paragraph P recites, wherein the response pattern includes changing among two or more types of focus of the user interface of the IUA.

R. The method as paragraph M recites, wherein providing the user interface of the IUA comprises displaying an icon or window that does not obscure any portion of a window of the application.

S. The method as paragraph M recites, wherein the application that is active is active in a virtual reality platform.

T. The method as paragraph M recites, wherein the application that is active includes a video game.

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "may" or "may," unless specifically stated otherwise, are understood within the context to present that certain examples include, while other examples do not include, certain features, variables and/or steps. Thus, such conditional language is not generally intended to imply that certain features, variables and/or steps are in any way required for one or more examples or that one or more examples necessarily include logic for deciding, with or without user input or prompting, whether certain features, variables and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any process descriptions, variables or blocks in the flow diagrams described herein and/or depicted in the attached figures should be understood as potentially representing modules, segments, or portions of code that include one or more executable instructions for implementing specific logical functions or variables in the routine. Alternate implementations are included within the scope of the examples described herein in which variables or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the variables of which are to be understood as being among other acceptable examples. All such modifications and variations are intended to be included herein within the scope of this disclosure and protected by the following claims.

What is claimed is:

1. A system comprising:
one or more processors; and
memory storing instructions to, upon execution by the one or more processors, configure the one or more processors to perform operations comprising:
providing, by a first application, content to a user interface (UI) of the system;
receiving, by a speech-based intelligent user agent (IUA) of the system, a speech-based command from a user, wherein the speech-based command is intended to interact with functionality external to the first application, and wherein, upon receiving the speech-based command, the speech-based IUA is executing in at least one of:
an obscured state, wherein the speech-based IUA runs in a background of the system and is not visible on the UI; or
a snap without focus state, wherein the speech-based IUA is visible on the UI without taking an input focus away from the first application when the content is being provided to the user;
determining a level of focus of the user with the content, wherein
a high level of focus is determined when the user is providing input to control features of the first application when the speech-based command is received; and
a low level of focus is determined when the user is not providing input to control features of the first application when the speech-based command is received;
when the user is determined to have the high level of focus with the content, providing, by the speech-based IUA, a first response to the speech-based command, wherein the first response is displayed in the UI such that the first response does not overlap the content; and
when the user is determined to have the low level of focus with the content, providing, by the speech-based IUA, a second response to the speech-based command, wherein the second response is displayed in the UI such that the second response overlaps the content.

2. The system of claim 1, wherein the content comprises at least one of playing a video game, engaging in an application, or viewing video content.

3. The system of claim 1, wherein an interface of the speech-based IUA is provided in an audio-only mode in the obscured state.

4. The system of claim 1, wherein a level of obtrusion of the speech-based IUA to the UI is based, at least in part, on the speech-based command.

5. The system of claim 1, wherein a communication between the user and the UI comprises the user interacting with the UI via a virtual reality platform.

6. The system of claim 4, wherein the speech-based command comprises a keyword and the level of obtrusion of the speech-based IUA to the UI is based on the keyword.

7. The system of claim 1, wherein the speech-based IUA comprises:
a first voice agent for interacting with functionality of the first application; and
a second voice agent for interacting with functionality of an operating system of the system, wherein the functionality of the first application is different from the functionality of the operating system.

8. The system of claim 7, wherein:
the first voice agent provides the first response based on the high level of focus of the user with the content, the high level of focus indicating that the user is actively entering input to control features of the first application when the speech-based command is received; and
the second voice agent provides the second response based on the low level of focus of the user with the content, the low level of focus indicating that the user is not entering input to control features of the first application when the speech-based command is received.

9. A system comprising:
one or more processing units; and
computer-readable media with modules thereon, the modules comprising:
a user agent module that, when executed by the one or more processing units, is configured to:
receive, from a first application, a speech-based command from a user, wherein the speech-based command is intended to interact with functionality external to the first application, and wherein, upon receiving the speech-based command, the user agent module is executing in at least one of:
an obscured state, wherein the user agent module runs in a background of the system and is not visible on a user interface (UI) of the system; or
a snap without focus state, wherein the user agent module is visible on the UI without taking an input focus away from the first application when content is being provided to the user; and
determine a level of focus of the user with the content, wherein:
a high level of focus is determined when the user is providing input to control features of the first application when the speech-based command is received; and
a low level of focus is determined when the user is not providing input to control features of the first application when the speech-based command is received; and a platform-specific user agent module that, when executed by the one or more processing units, is configured to:
- based on the level of focus of the user with the content, provide a response to the speech-based command at a level of obtrusion to the UI that is inversely proportional to the level of engagement of the user with the content such that:
  - when the high level of focus is determined, the response does not overlap the content when displayed in the UI; and
  - when the low level of focus is determined, the response overlaps the content when displayed in the UI.

10. The system of claim 9, wherein the user agent module, when executed by the one or more processing units, is further configured to set the level of obtrusion of the user agent module to the UI based, at least in part, on a context of the user with respect to the system.

11. The system of claim 9, wherein the user agent module, when executed by the one or more processing units, is further configured to set the level of obtrusion of the user agent module to the UI based, at least in part, on at least one of current or historical actions of the user.

12. The system of claim 9, wherein the platform-specific user agent module, when executed by the one or more processing units, is further configured to provide the user agent module to the user at the level of obtrusion to the UI set by the user agent module.

13. The system of claim 9, wherein the platform-specific user agent module, when executed by the one or more processing units, is further configured to determine, based at least in part on a particular platform, whether an interface of the user agent module is at least one of audio or visual.

14. The system of claim 9, wherein the platform-specific user agent module, when executed by the one or more processing units, is further configured to determine, based at least in part on a particular platform, a type of focus for input to the user agent module from the user.

15. A method comprising:
- providing, by a first application, content to a user interface (UI) of a system;
- receiving, by a speech-based intelligent user agent (IUA), a speech-based command from a user, wherein the speech-based command is intended to interact with functionality external to the first application, and wherein, upon receiving the speech-based command, the speech-based IUA is executing in at least one of:
  - an obscured state, wherein the speech-based IUA runs in a background of the system and is not visible on the UI; or
  - a snap without focus state, wherein the speech-based IUA is visible on the UI without taking an input focus away from the first application when the content is being provided to the user;
- determining a level of focus of the user with the content, wherein:
  - a high level of focus is determined when the user is providing input to control the first application when the speech-based command is received; and
  - a low level of focus is determined when the user is not providing input to the first application when the speech-based command is received;
- when the user is determined to have the high level of focus with the content, providing, by the speech-based IUA, a first response to the speech-based command, wherein the first response is displayed in the UI such that the first response does not overlap the content; and
- when the user is determined to have the low level of focus with the content, providing, by the speech-based IUA, a second response to the speech-based command, wherein the second response is displayed in the UI such that the second response overlaps the content.

16. The method of claim 15, further comprising:
- analyzing the speech-based command to determine an intent of the user; and
- selecting a voice agent to respond to the user, wherein the selecting is based, at least in part, on the intent of the user and the first application.

17. The method of claim 16, further comprising:
- receiving instructions from the voice agent to prompt the user for additional speech-based input.

18. The method of claim 16, further comprising:
- receiving instructions from the voice agent for a response pattern that is based, at least in part, on a current status of the user in relation to the first application.

19. The method of claim 15, wherein an interface of the speech-based IUA is provided in an audio-only mode in the obscured state.

20. The method of claim 15, wherein the first application is active in a virtual reality platform.

* * * * *